US012671213B2

(12) United States Patent
Churnovic et al.

(10) Patent No.: US 12,671,213 B2
(45) Date of Patent: Jun. 30, 2026

(54) SHIELDED KEYSTONE STYLE PUNCHDOWN JACK

(71) Applicant: Panduit Corp., Tinley Park, IL (US)

(72) Inventors: Roman J. Churnovic, Manhattan, IL (US); Robert E. Fransen, Orland Park, IL (US)

(73) Assignee: Panduit Corp., Tinley Park, IL (US)

( * ) Notice: Subject to any disclaimer, the term of this patent is extended or adjusted under 35 U.S.C. 154(b) by 368 days.

(21) Appl. No.: 18/098,183

(22) Filed: Jan. 18, 2023

(65) Prior Publication Data

US 2024/0243526 A1 Jul. 18, 2024

(51) Int. Cl.
*H01R 13/6582* (2011.01)
*H01R 4/2429* (2018.01)
*H01R 24/64* (2011.01)

(52) U.S. Cl.
CPC ....... *H01R 13/6582* (2013.01); *H01R 4/2429* (2013.01); *H01R 24/64* (2013.01); *H01R 2201/04* (2013.01)

(58) Field of Classification Search
CPC .............. H01R 13/6582; H01R 4/2433; H01R 4/2429; H01R 24/64; H01R 2201/04
USPC ............................... 439/607.01, 417, 607.41
See application file for complete search history.

(56) References Cited

U.S. PATENT DOCUMENTS 5,302,140 A 4/1994 Arnett
5,645,444 A 7/1997 Sahlberg et al.
5,924,896 A 7/1999 Arnett et al.
6,083,052 A 7/2000 Adams et al.
6,238,231 B1 * 5/2001 Chapman ........... H01R 13/5829 439/417
6,267,617 B1 * 7/2001 Nozick ................ H01R 4/2433 439/417
6,334,792 B1 1/2002 Schmidt et al.
6,435,898 B2 8/2002 Sahlberg et al.
6,488,525 B2 12/2002 Abel et al.
6,629,862 B2 10/2003 Schmidt et al.
6,767,241 B1 * 7/2004 Abel ...................... H01R 24/64 439/417
6,830,488 B2 12/2004 Bush et al.
7,118,405 B2 * 10/2006 Peng .................... H01R 4/2433 439/417
7,413,464 B1 * 8/2008 Chen .................. H01R 13/5829 439/417
RE40,575 E 11/2008 Schmidt et al.
7,563,125 B2 * 7/2009 Pepe .................... H01R 13/502 439/417
7,766,688 B2 * 8/2010 Mateo Ferrus ...... H01R 13/501 439/417
7,972,150 B1 * 7/2011 Lin .................... H01R 13/6461 439/607.03

(Continued)

FOREIGN PATENT DOCUMENTS

CN 106415944 A 2/2017

*Primary Examiner* — Gary F Paumen
(74) *Attorney, Agent, or Firm* — Christopher K. Marlow; Christopher S. Clancy; James H. Williams

(57) ABSTRACT

A rear wire cover assembly for a keystone style punchdown jack has a shield wrap and an opening configured to allow the rear wire cover assembly to move in a direction perpendicular to an axis of the cable such as to partially enclose the cable and also such as to allow the rear wire cover assembly to move along the axis of the cable to engage a rear of the keystone style punchdown jack.

6 Claims, 21 Drawing Sheets

(56) References Cited

U.S. PATENT DOCUMENTS

| | | | | |
|---|---|---|---|---|
| 8,011,949 | B2 * | 9/2011 | Foratier ............... | H01R 4/2433 439/417 |
| 10,777,953 | B2 * | 9/2020 | White .................... | H01R 24/64 |
| 2006/0003623 | A1 * | 1/2006 | Mossner .............. | H01R 13/582 439/417 |
| 2007/0026736 | A1 * | 2/2007 | Itano .................... | H01R 13/518 439/607.55 |
| 2009/0098777 | A1 | 4/2009 | Abughazaleh et al. | |
| 2012/0202389 | A1 | 8/2012 | Erickson et al. | |
| 2015/0236432 | A1 * | 8/2015 | Lin .................... | H01R 13/5841 439/367 |

* cited by examiner

SHIELDED KEYSTONE STYLE PUNCHDOWN JACK

FIELD OF THE INVENTION

The present invention is related generally to RJ45 style connectors and more specifically to a keystone style punch-down jack with a rear wire cover assembly.

BACKGROUND

The market currently offers several Mini-Com shielded TG jack modules and several unshielded keystone style punch down jack modules. What is needed is a shielded keystone jack that utilizes the existing punch down style termination method and is cost competitive to existing shielded Mini-Com jacks with a TG style termination method. Specifically, one with a rear wire cover assembly that can electrically connect a braid of a shielded cable to the shield of the jack and secure conductors to the shield of the jack.

SUMMARY

A rear wire cover assembly for a keystone style punch-down jack has a shield wrap and an opening configured to allow the rear wire cover assembly to move in a direction perpendicular to an axis of the cable such as to partially enclose the cable and also such as to allow the rear wire cover assembly to move along the axis of the cable to engage a rear of the keystone style punchdown jack.

DESCRIPTION OF THE INVENTION

Figure 1:
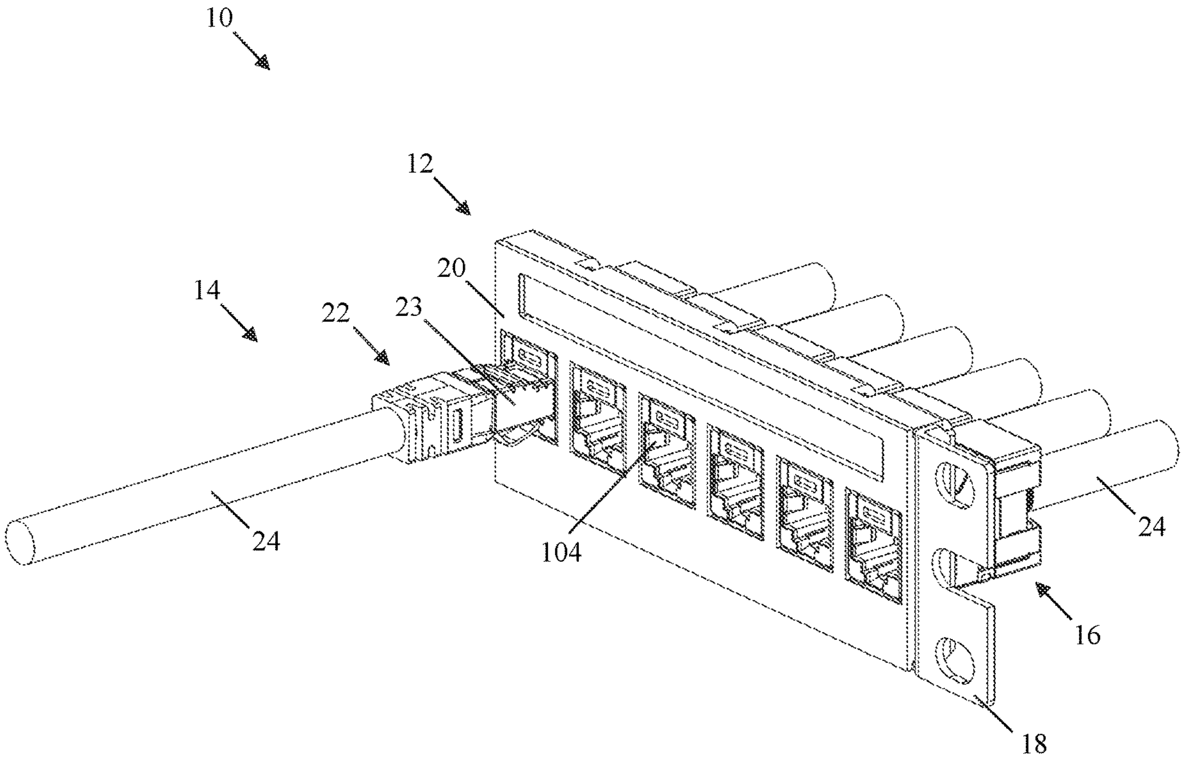
FIG. 1 is an isometric view of communications system 10.

FIG. 1 is an isometric view of communications system 10 which includes shielded patch panel 12, patch cord assembly 14, and terminated jack assemblies 16. Communications system 10 can further include cabinets, racks, cable management, patch panels, overhead routing systems, horizontal cabling, and other such equipment. Shielded patch panel 12 includes formed metal panel 18 and faceplate insert 20. Patch cord assembly 14 includes shielded plug assembly 22 and shielded cable 24.

Figure 2:
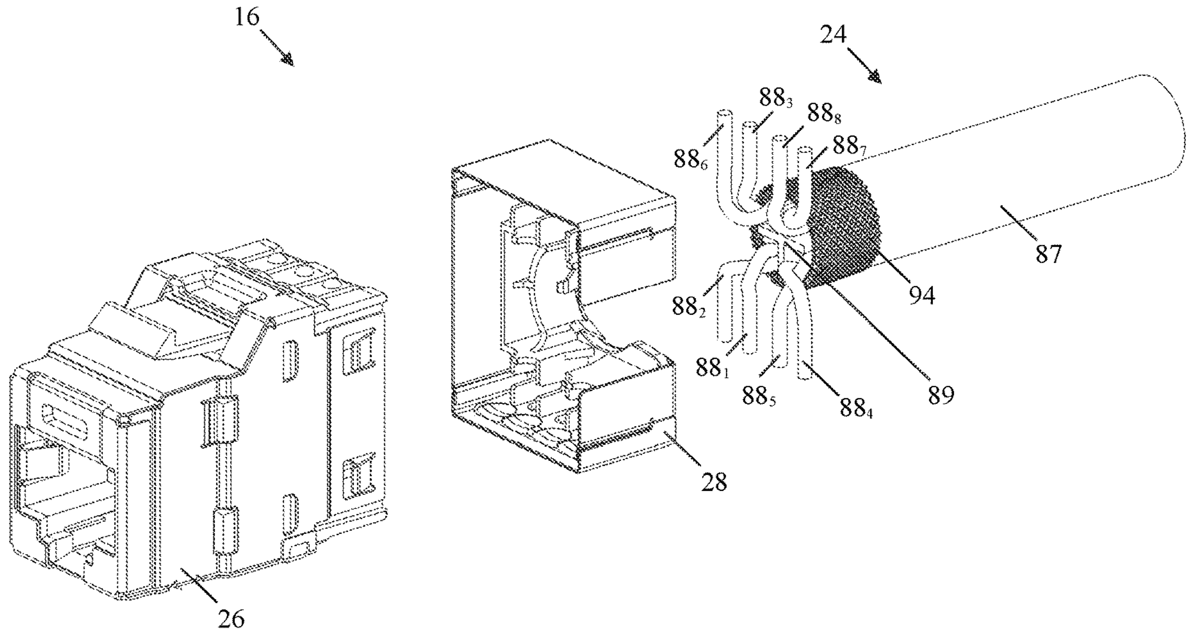
FIG. 2 is an isometric exploded view of terminated jack assembly 16.

FIG. 2 is an isometric exploded view of terminated jack assembly 16. Terminated jack assembly 16 includes shielded cable 24, jack housing assembly 26, and rear wire cover assembly 28. Shielded cable 24 includes cable jacket 87, conductors 88, conductor divider 89, and braid 94.

Figure 3:
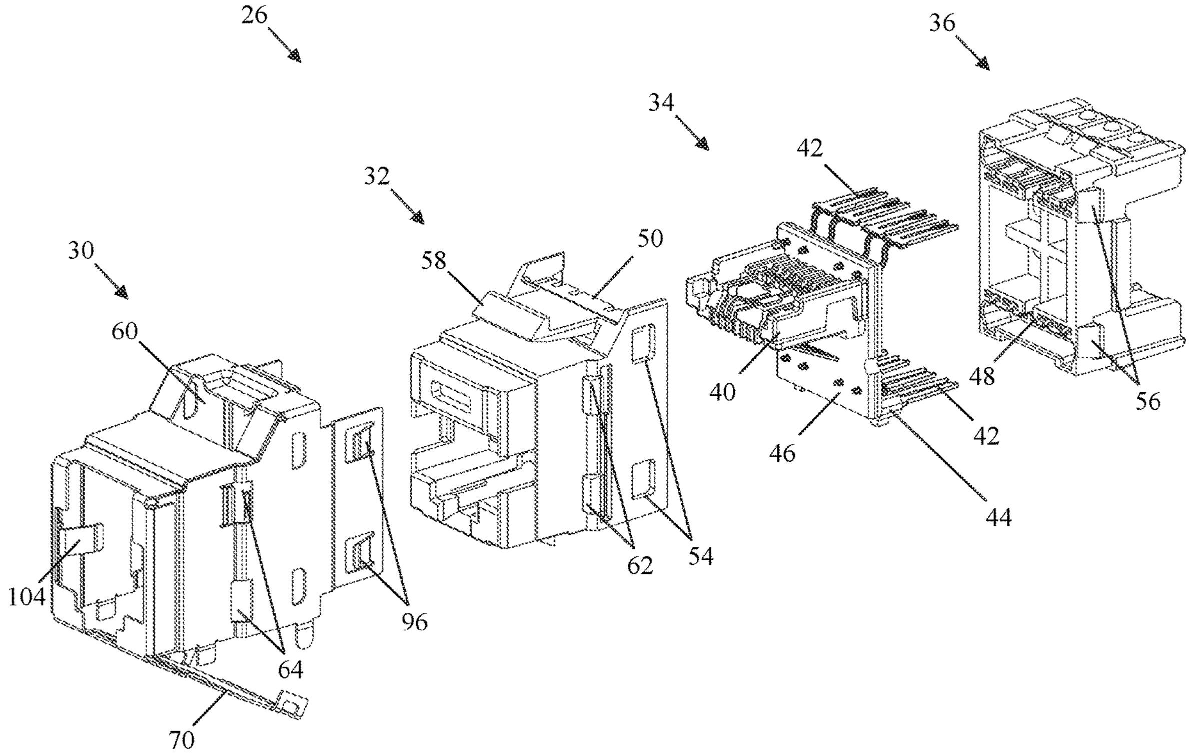
FIG. 3 is a front top exploded view of jack housing assembly 26.
Figure 4:
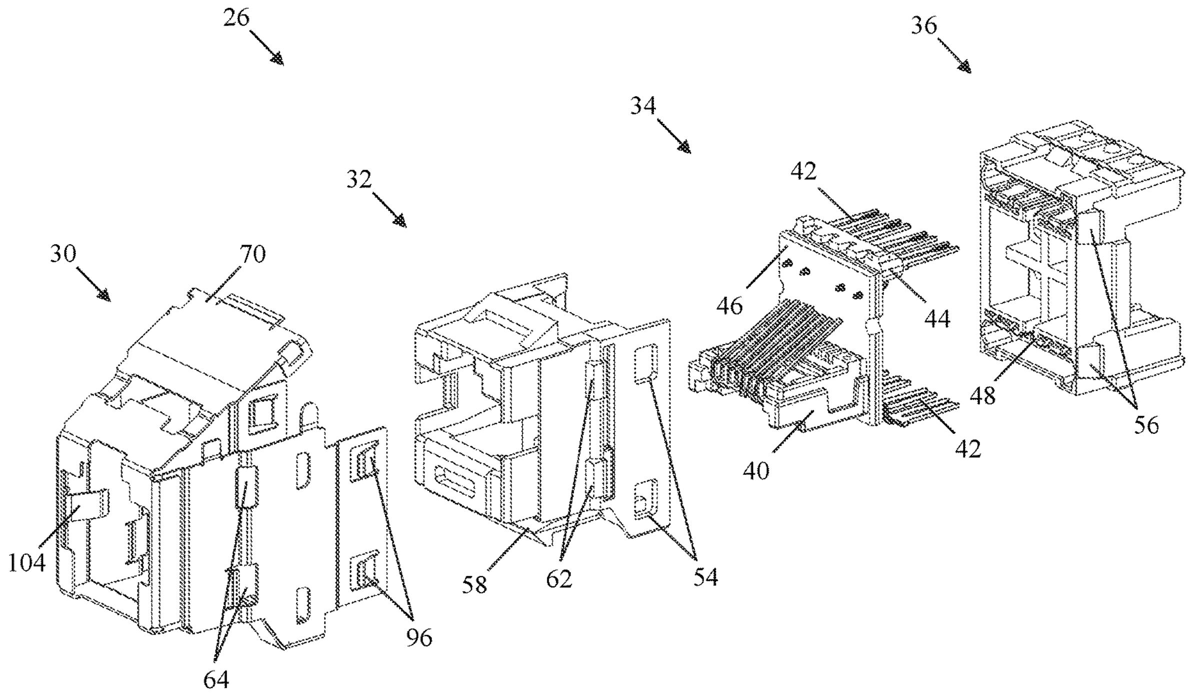
FIG. 4 is a front bottom exploded view of jack housing assembly 26.
Figure 5:
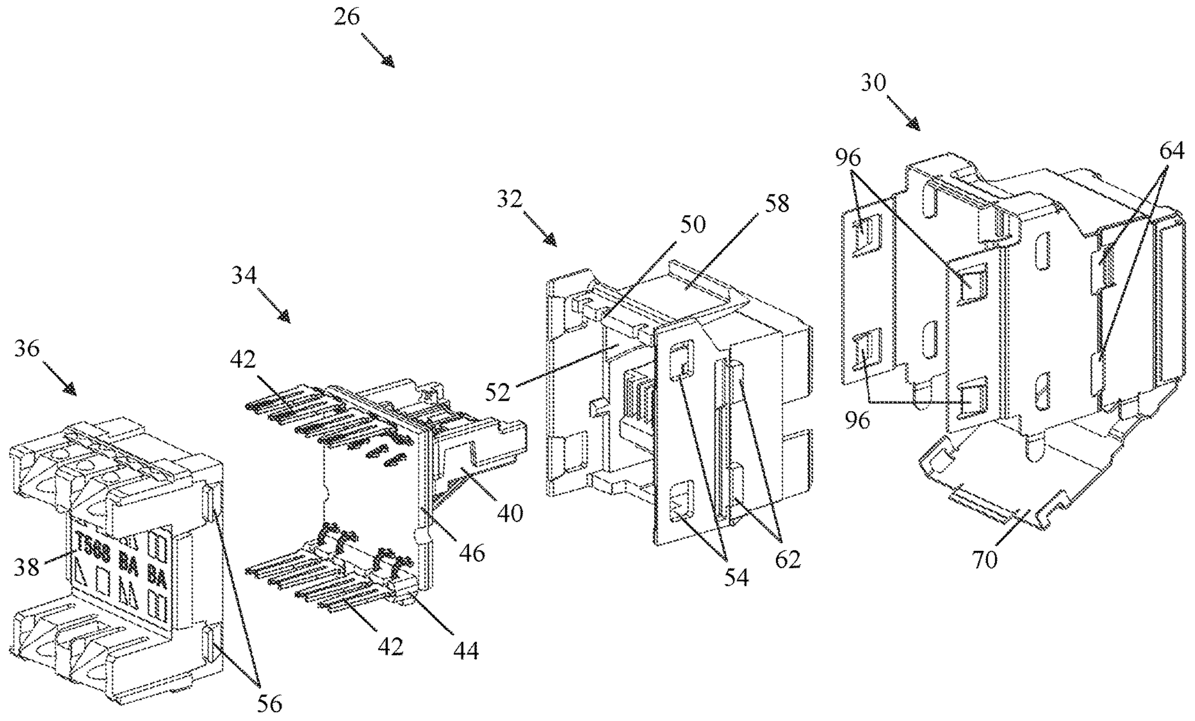
FIG. 5 is a rear top exploded view of jack housing assembly 26.
Figure 6:
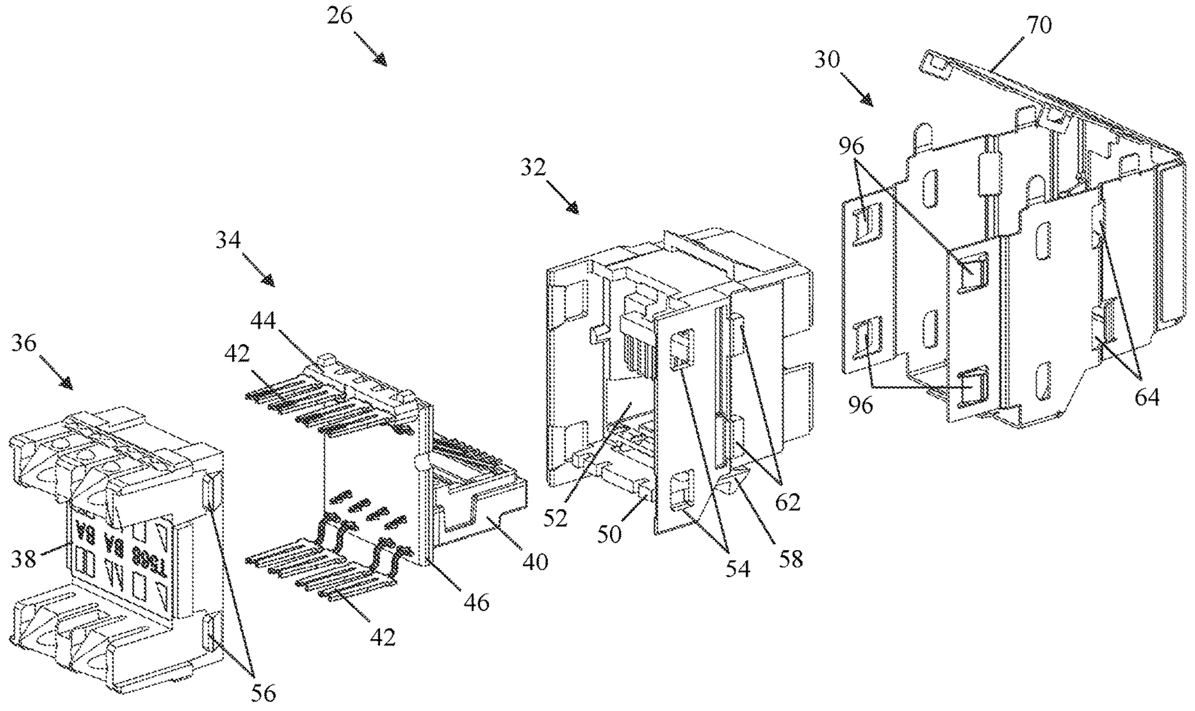
FIG. 6 depicts front shield wrap 30 in its open state prior to the final forming.

FIG. 3 is a front top exploded view of jack housing assembly 26. FIG. 4 is a front bottom exploded view of jack housing assembly 26. FIG. 5 is a rear top exploded view of jack housing assembly 26. FIG. 6 is a rear bottom exploded view of jack housing assembly 26. Jack housing assembly 26 includes front shield wrap 30, jack housing 32, PCB assembly 34, rear sled 36, and wire map label 38 (FIG. 5-FIG. 6). FIG. 3-FIG. 6 depict front shield wrap 30 in its open state prior to the final forming. PCB assembly 34 includes sled assembly 40, long IDCs 42, IDC Support 44, and PCB 46. PCB assembly 34 is constructed and utilized in a manner identical to current production unshielded keystone punch down jack modules.

Long IDCs 42 of PCB assembly 34 are press fit into channels 48 of rear sled 36 to keep long IDCs 42 constrained during the termination process. IDC support 44 of PCB assembly 34 and lower support wall 50 of jack housing 32 provide support to long IDCs 42 of PCB assembly 34 during the assembly process. Sled assembly 40 of PCB assembly 34 slides into opening 52 on jack housing 32 (FIG. 5-FIG. 6). D-window latches 54 on jack housing 32 snap over catches 56 of rear sled 36 to secure components together. Wire map label 38 has an adhesive backing that secures it to rear sled 36. Jack housing 32, PCB assembly 34, rear sled 36, and wire map label 38, in an assembled state, are slid into front shield wrap 30. Flexible latch 58 on jack housing 32 slides through opening 60 of front shield wrap 30. Side stops 62 of jack housing 32 pass through windows 64 of front shield wrap 30 and help keep all components from separating prior to the final forming of front shield wrap 30.

Figure 7:
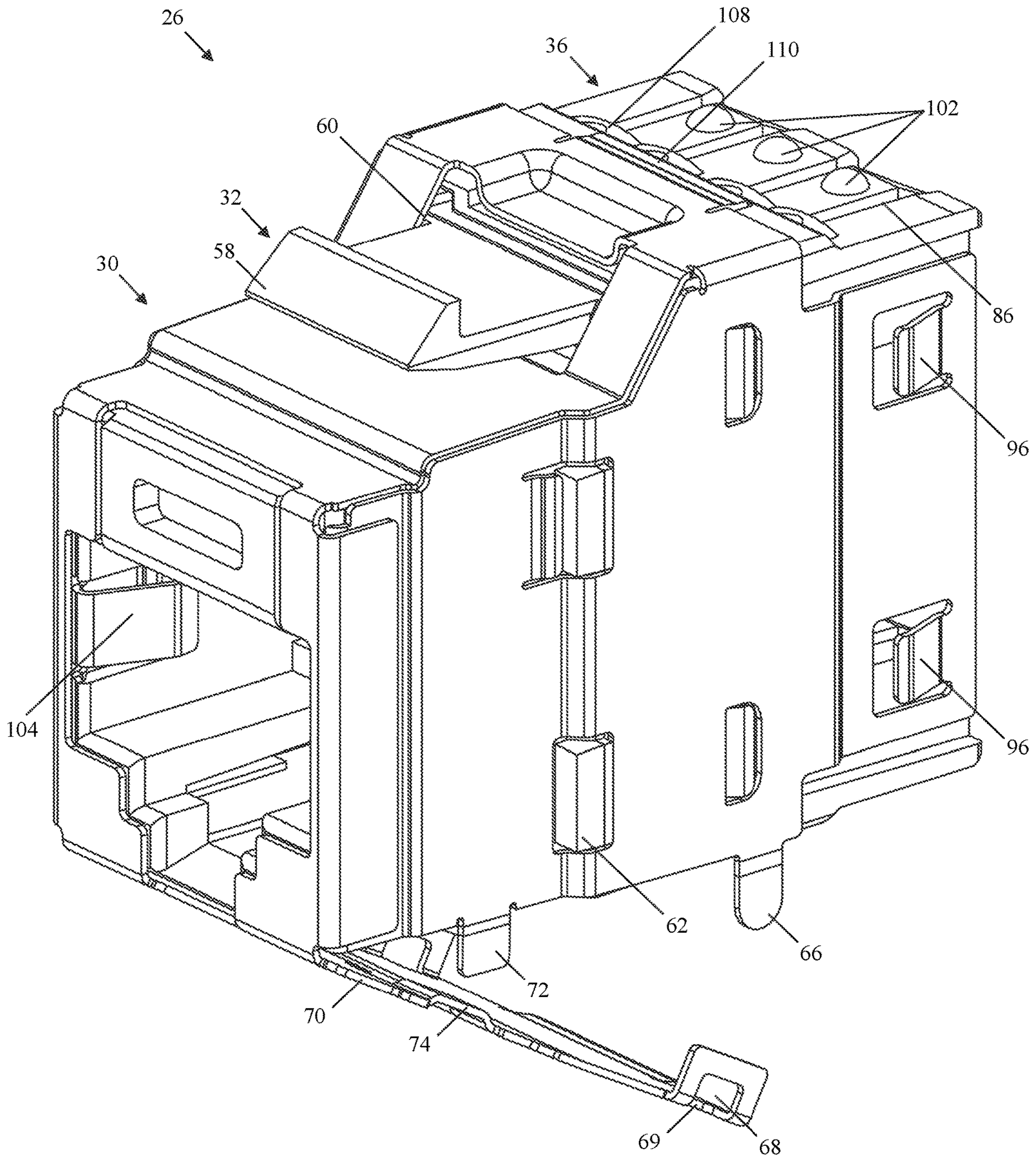
FIG. 7 is a front top view of jack housing assembly 26.
Figure 8:
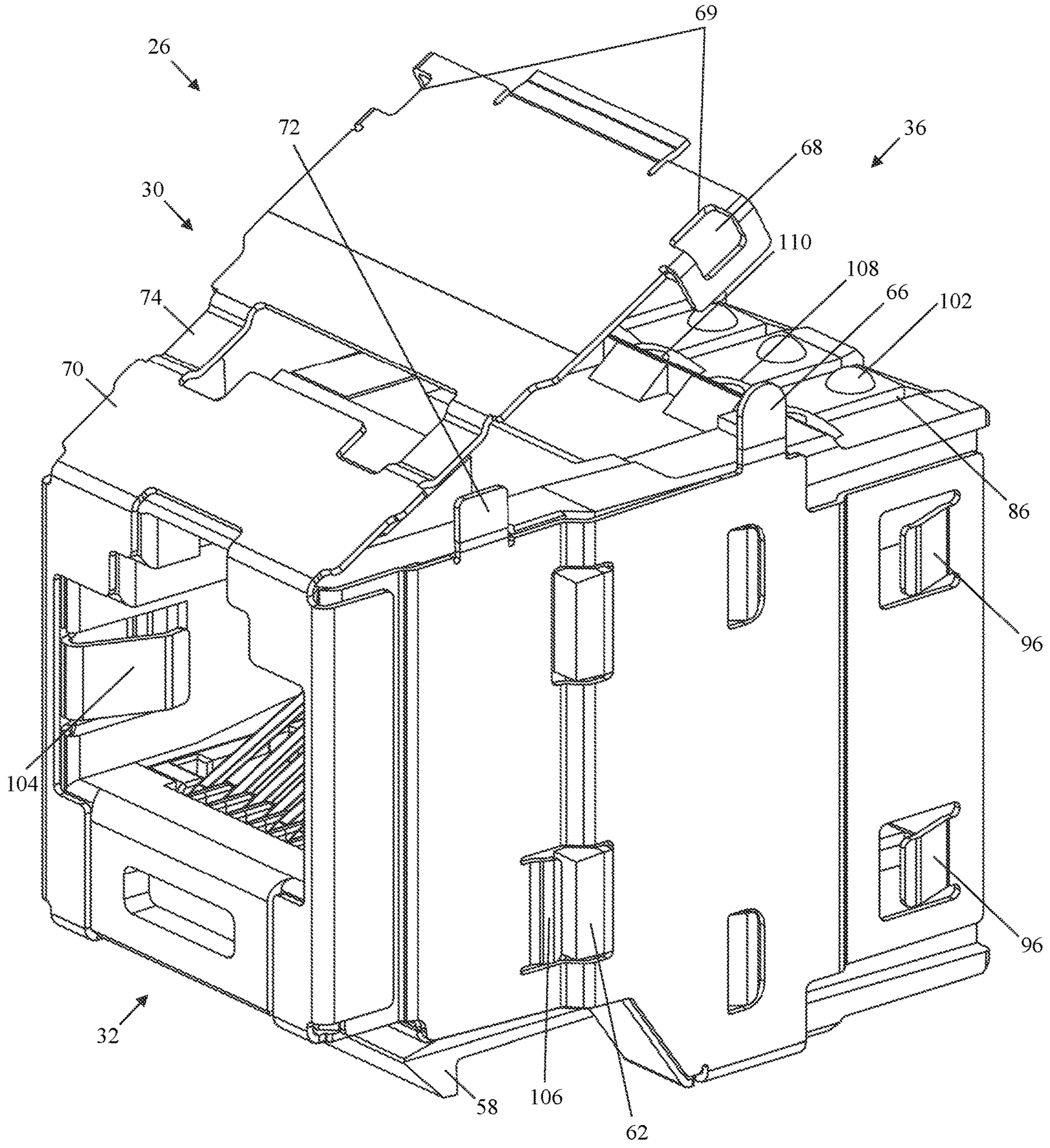
FIG. 8 is a front bottom view of jack housing assembly 26.
Figure 9:
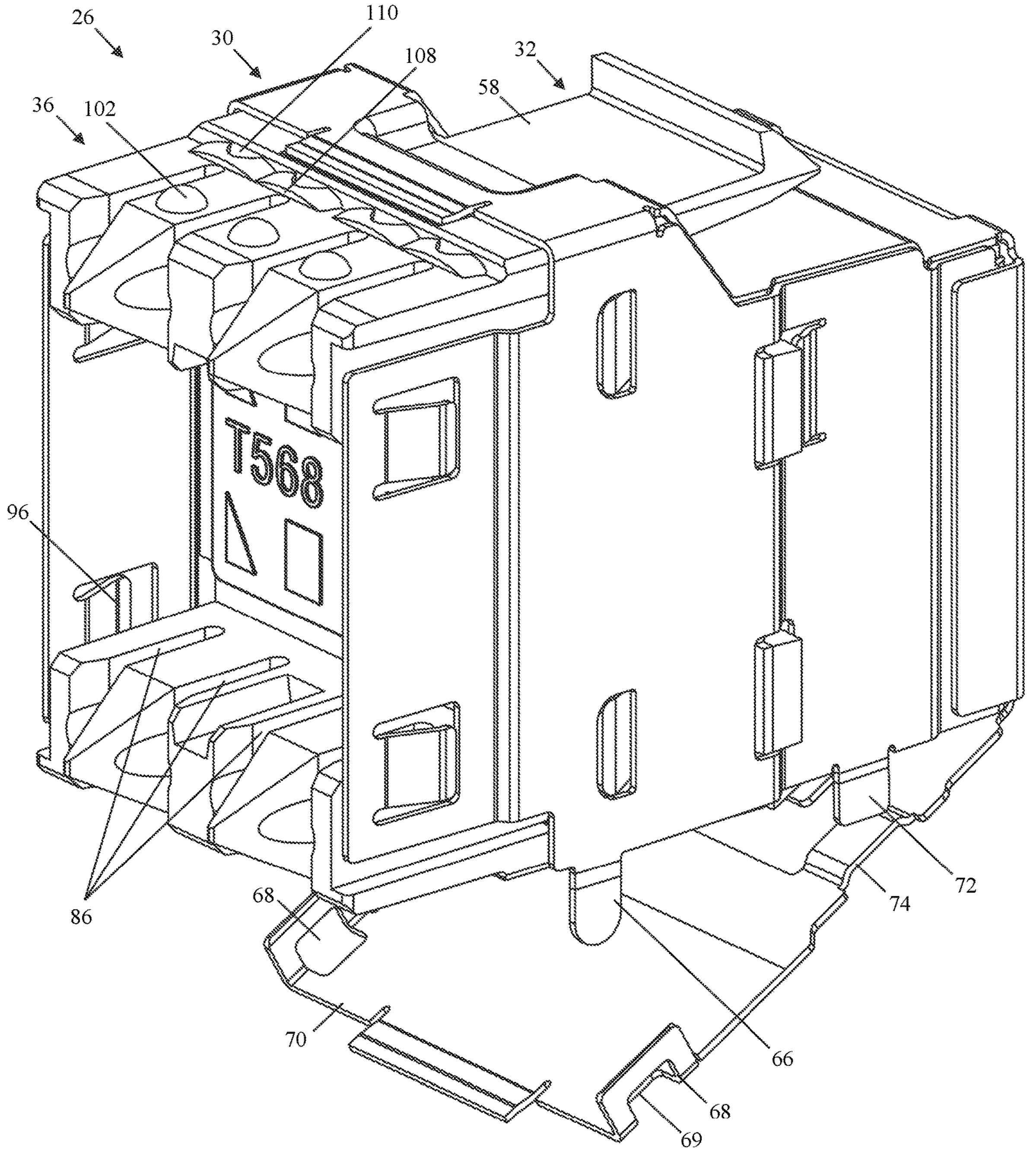
FIG. 9 is a rear top view of jack housing assembly 26 with front shield wrap 30 in its open state.
Figure 10:
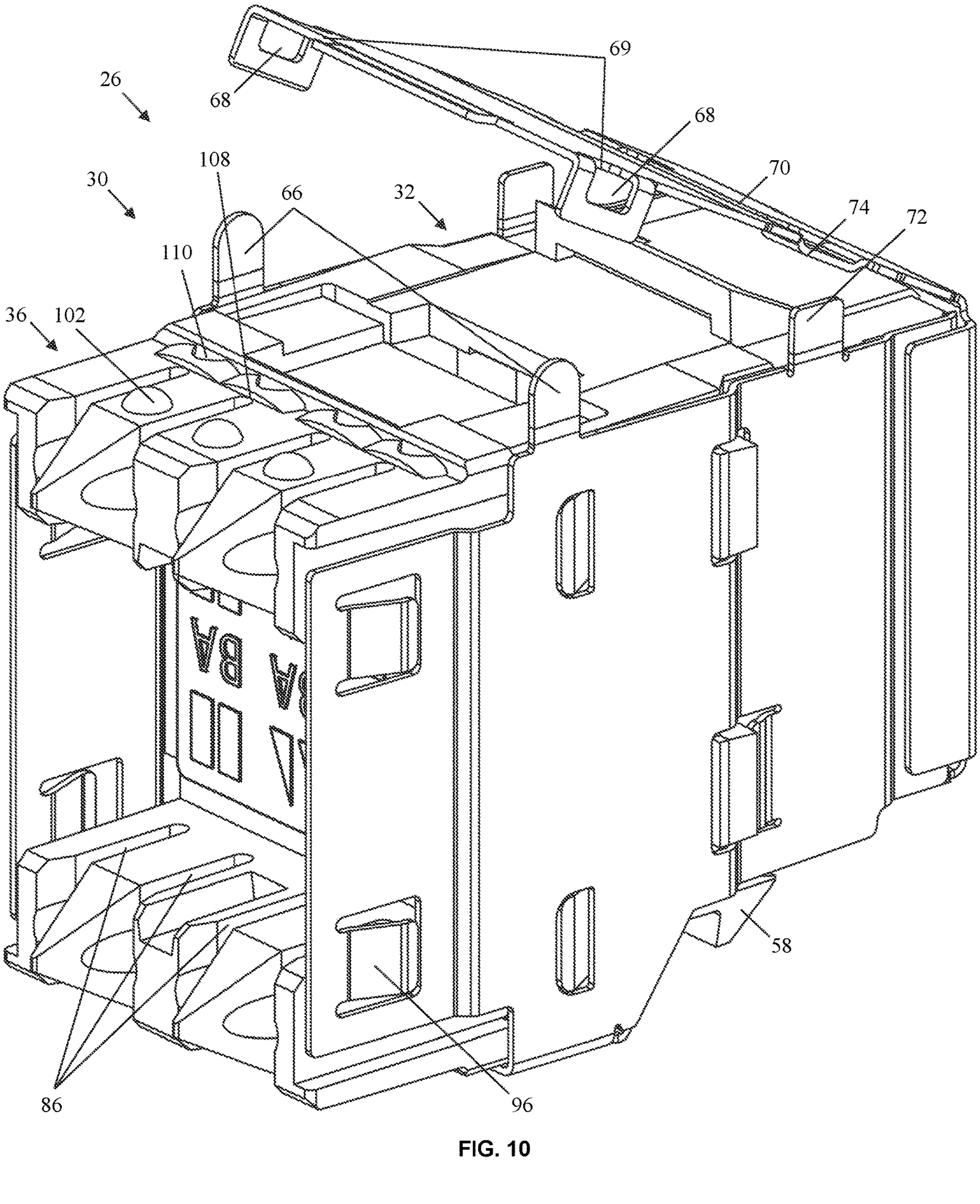
FIG. 10 is a rear bottom view of jack housing assembly 26 with front shield wrap 30 in its open state.

FIG. 7 is a front top view of jack housing assembly 26 with front shield wrap 30 in its open state prior to the final assembly. FIG. 8 is a front bottom view of jack housing assembly 26 with front shield wrap 30 in its open state. FIG. 9 is a rear top view of jack housing assembly 26 with front shield wrap 30 in its open state. FIG. 10 is a rear bottom view of jack housing assembly 26 with front shield wrap 30 in its open state. Rear tabs 66 pass through holes 68 as flange 70 is brought to a final position for front shield wrap 30. Rear tabs 66 are then formed over edges 69 of holes 68 to secure front shield wrap 30 in a locked position. Front tabs 72 are formed over offset geometry 74 on flange 70 of front shield wrap 30 for added security and shielding continuity.

Figure 11:
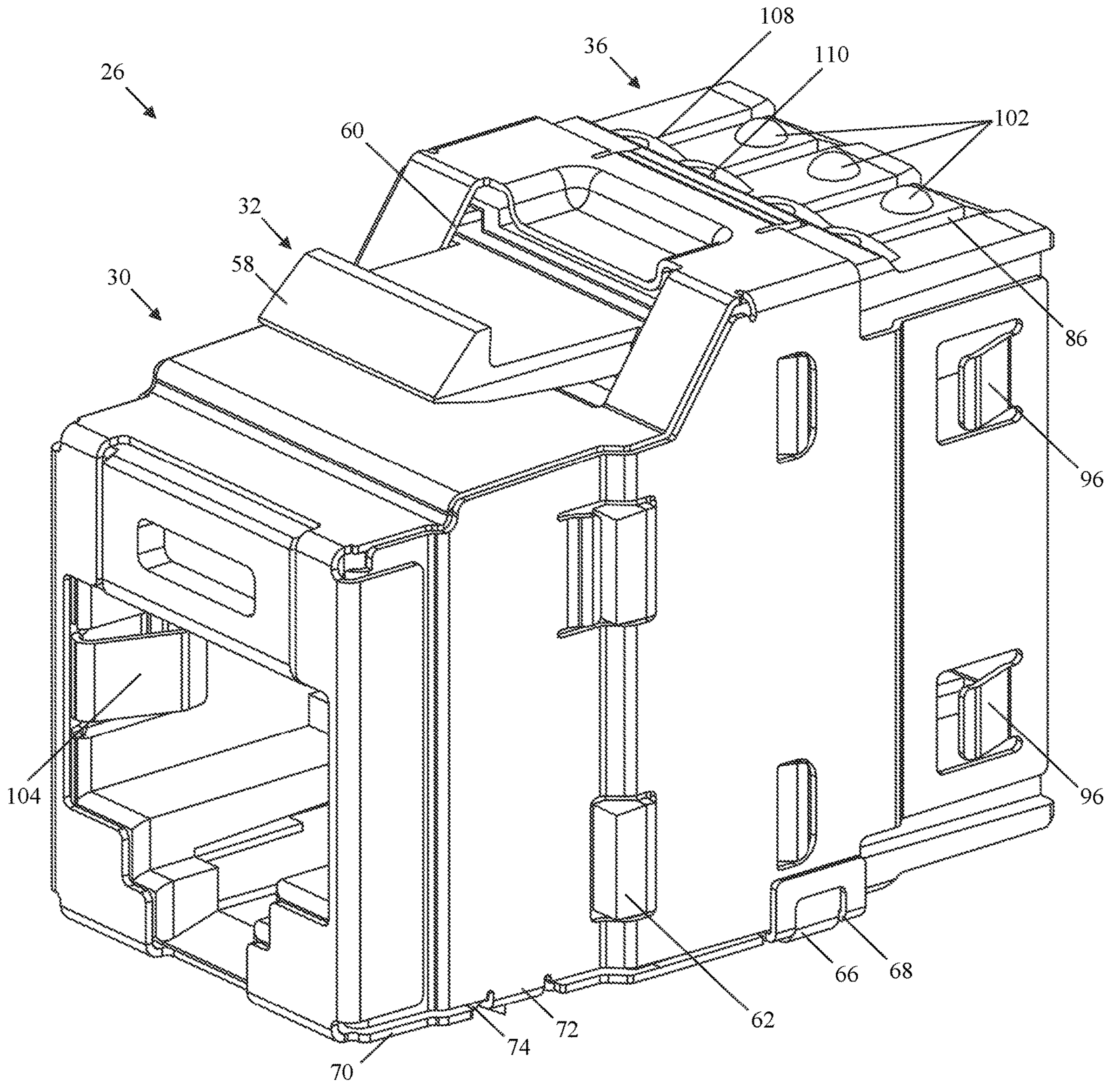
FIG. 11 is a front top view of jack housing assembly 26 with front shield wrap 30 in its closed state.
Figure 12:
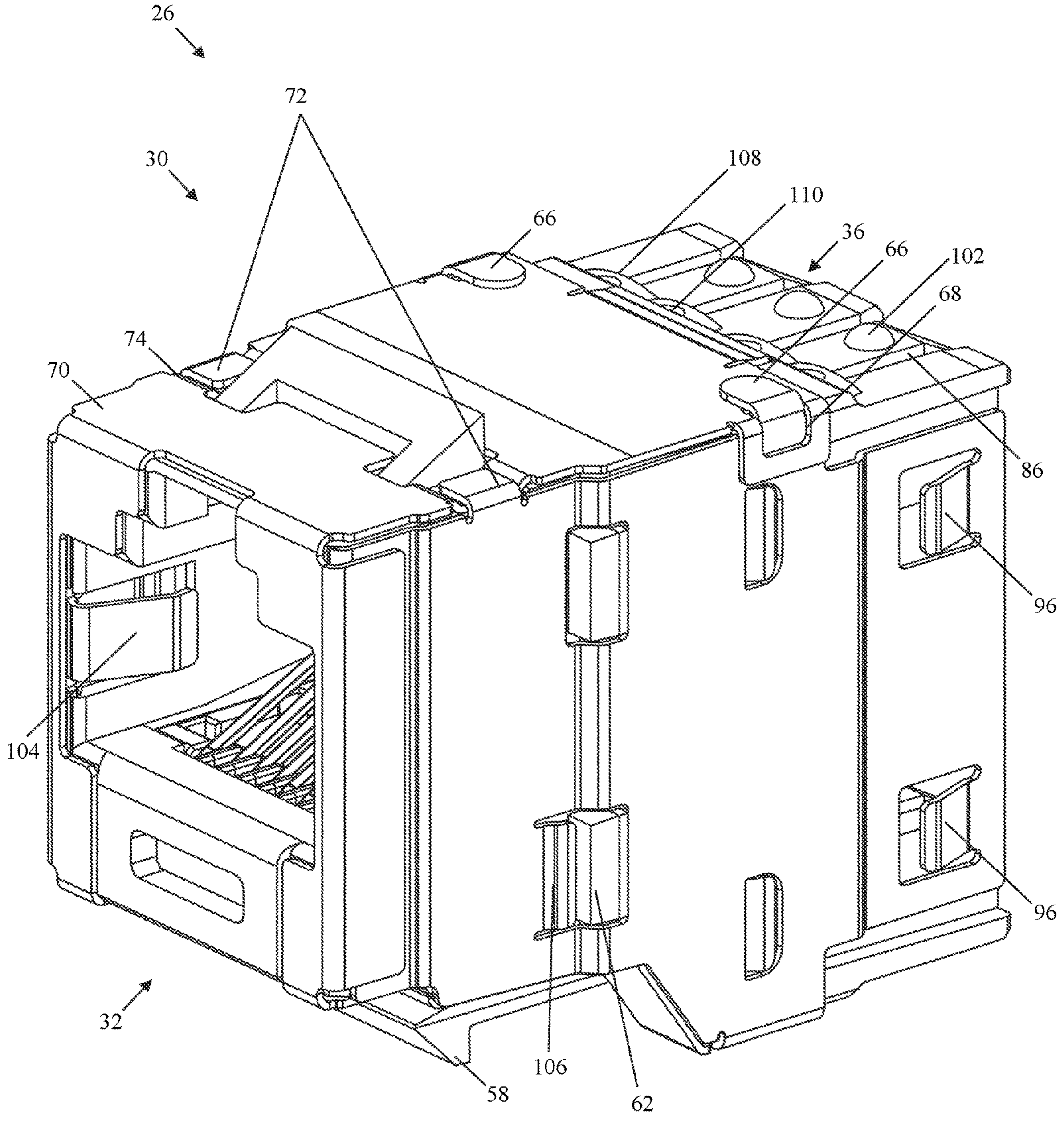
FIG. 12 is a front bottom view of jack housing assembly 26 with front shield wrap 30 in its closed state.
Figure 13:
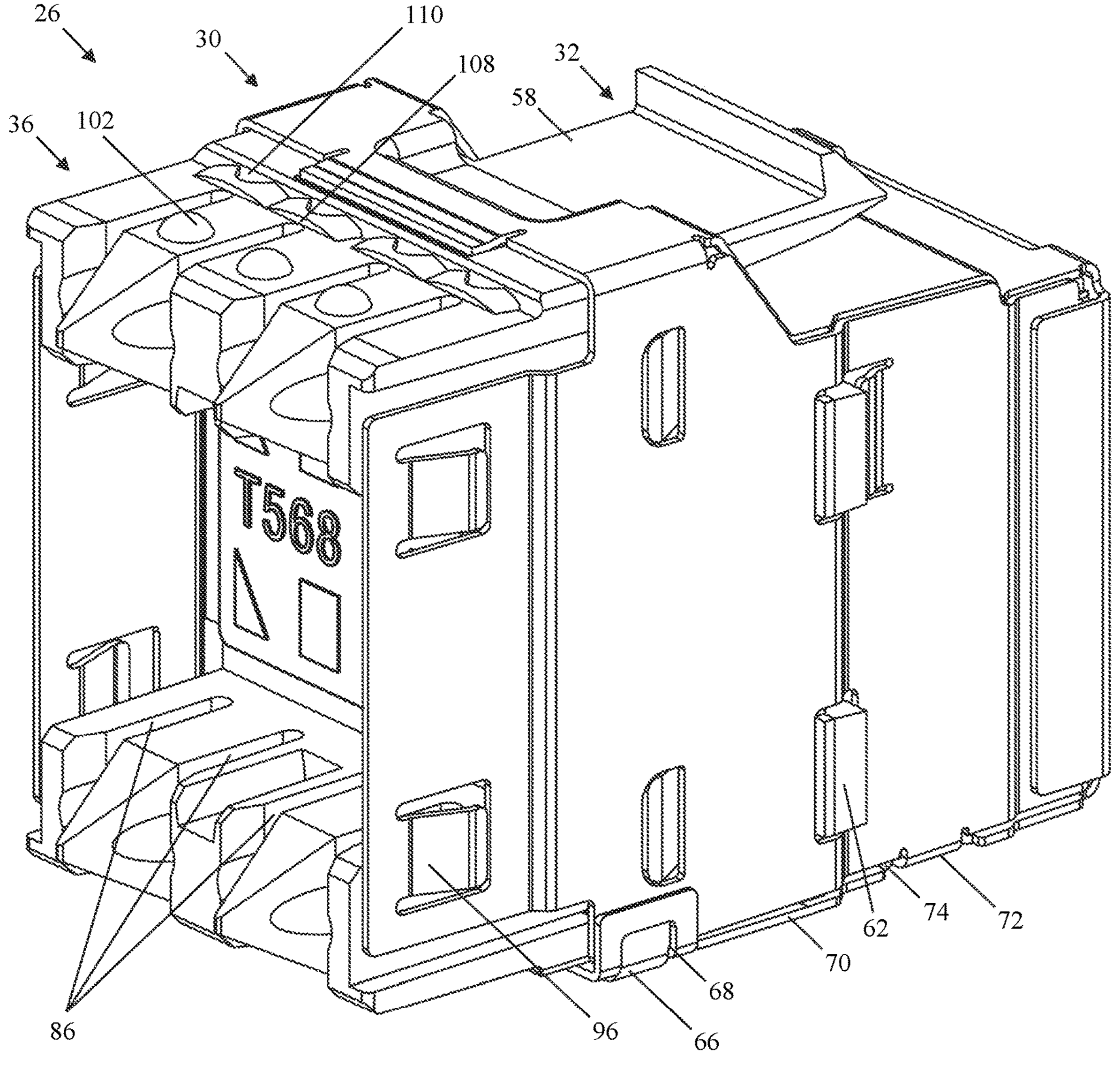
FIG. 13 is a rear top view of jack housing assembly 26 with front shield wrap 30 in its closed state.
Figure 14:
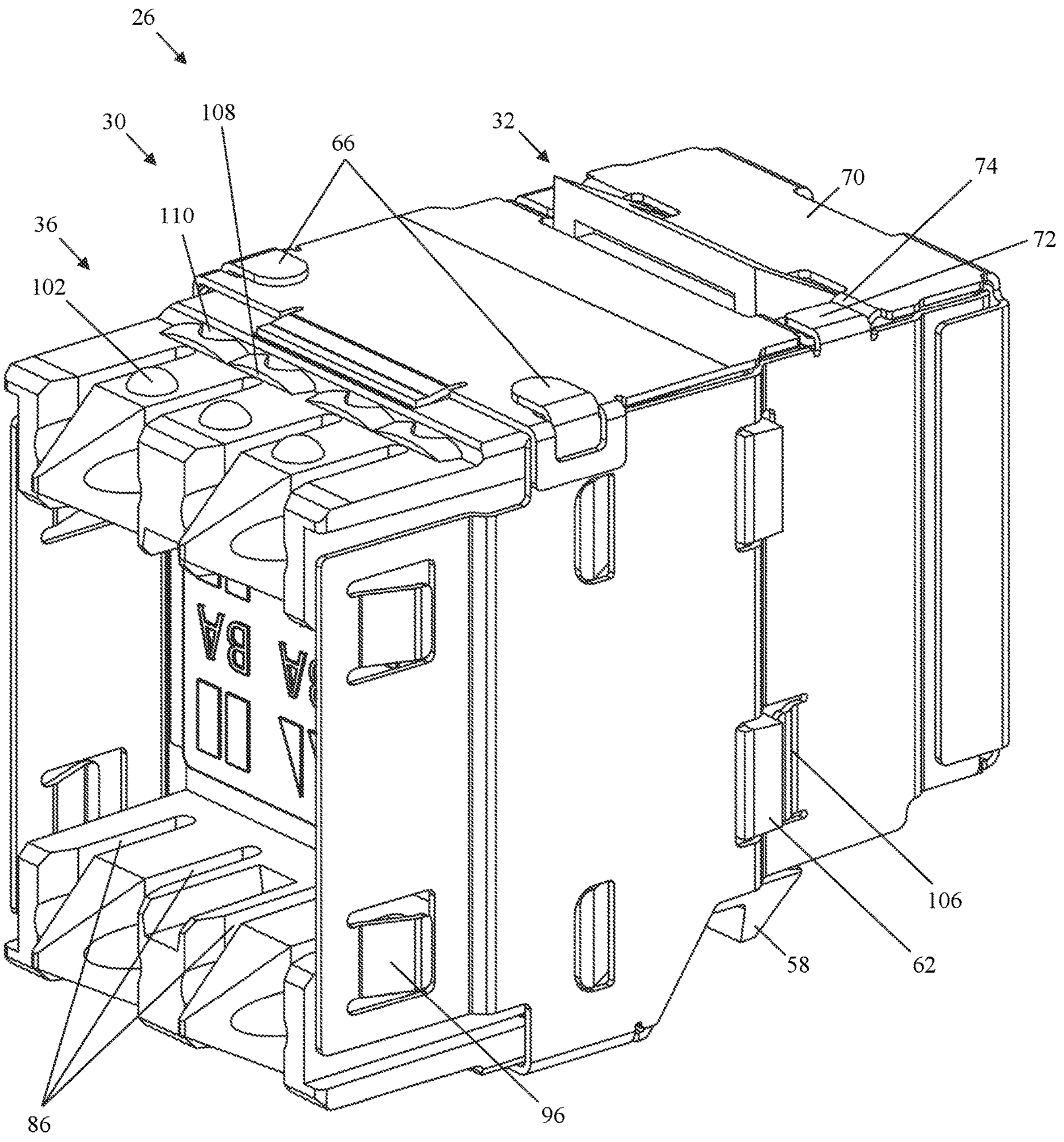
FIG. 14 is a rear bottom view of jack housing assembly 26 with front shield wrap 30 in its closed state.

FIG. 11 is a front top view of jack housing assembly 26 with front shield wrap 30 in its closed state. FIG. 12 is a front bottom view of jack housing assembly 26 with front shield wrap 30 in its closed state. FIG. 13 is a rear top view of jack housing assembly 26 with front shield wrap 30 in its closed state. FIG. 14 is a rear bottom view of jack housing assembly 26 with front shield wrap 30 in its closed state.

Figure 15:
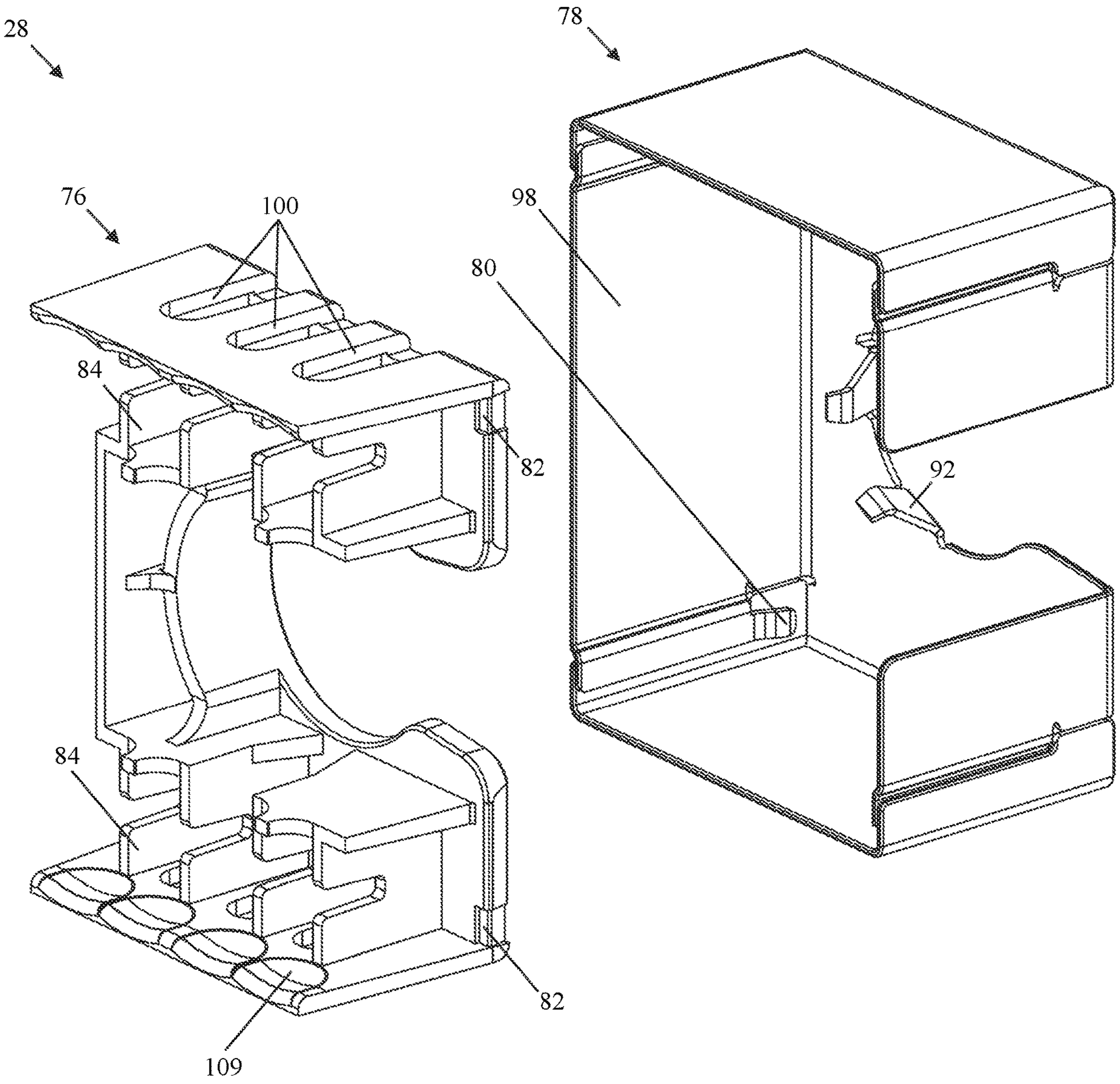
FIG. 15 is a front top exploded view of rear wire cover assembly 28.
Figure 16:
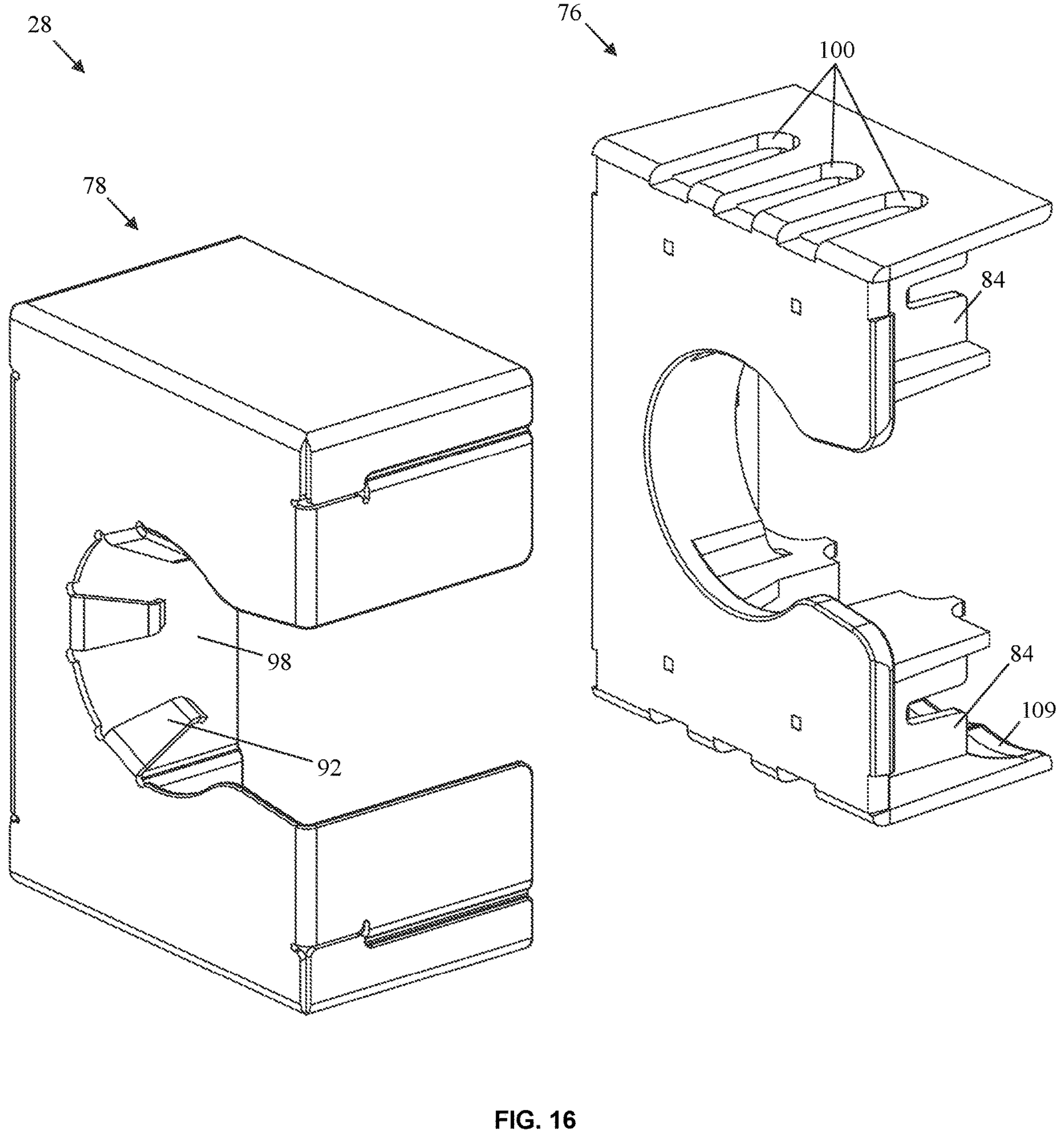
FIG. 16 is a rear bottom exploded view of rear wire cover assembly 28.

FIG. 15 is a front top exploded view of rear wire cover assembly 28. FIG. 16 is a rear bottom exploded view of rear wire cover assembly 28. Rear wire cover assembly 28 includes wire cover 76 and wire cover shield wrap 78. Wire cover 76 is placed into wire cover shield wrap 78. Return flanges 80 on wire cover shield wrap 78 catch to flat edges 82 on wire cover 76 to secure the components together.

Figure 17:
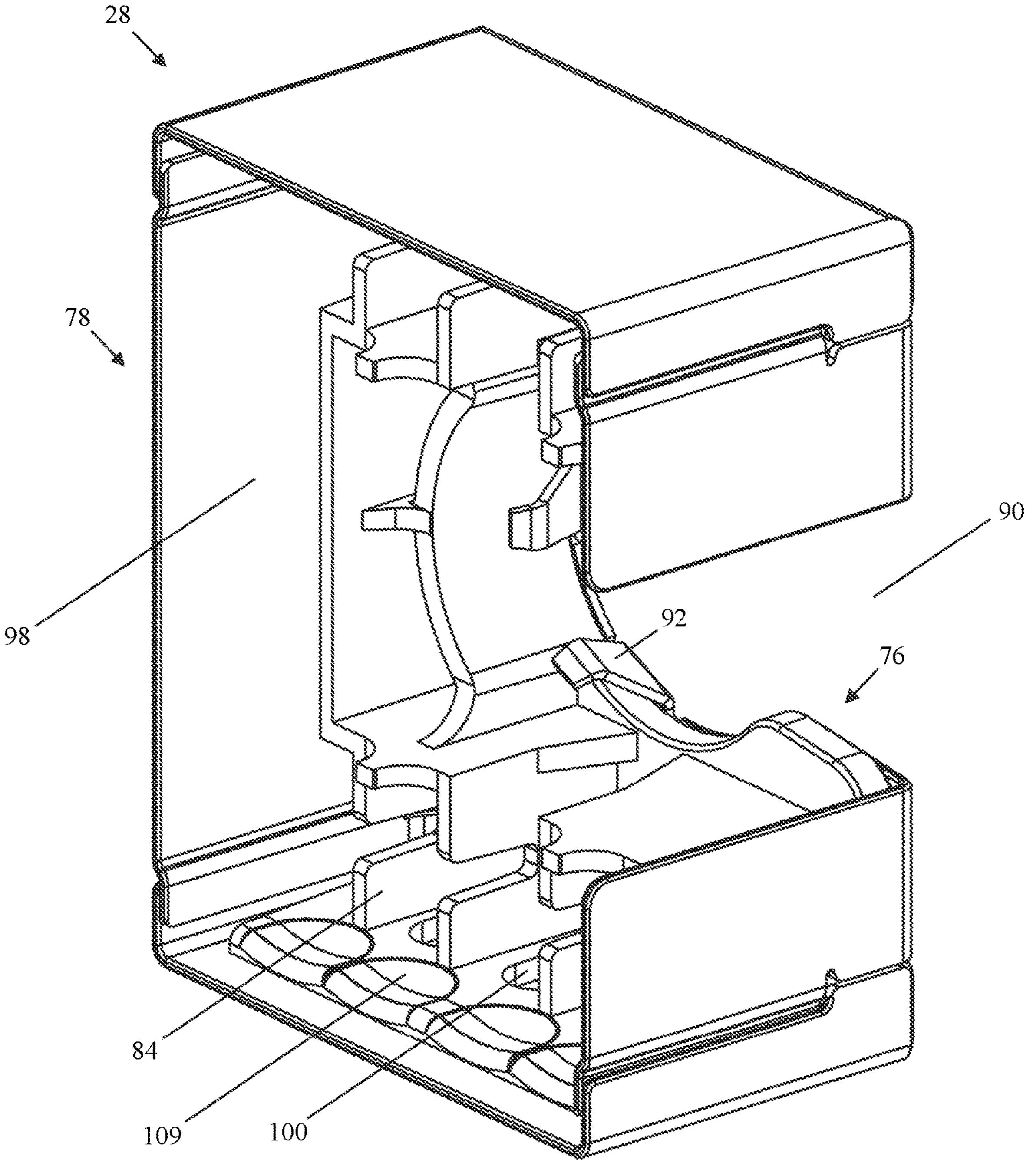
FIG. 17 is a front top view of rear wire cover assembly 28.

FIG. 17 is a front top view of rear wire cover assembly 28. Rear wire cover assembly 28 is symmetrically designed to allow cable opening 90 to point to either the left or right after final assembly.

Figure 18:
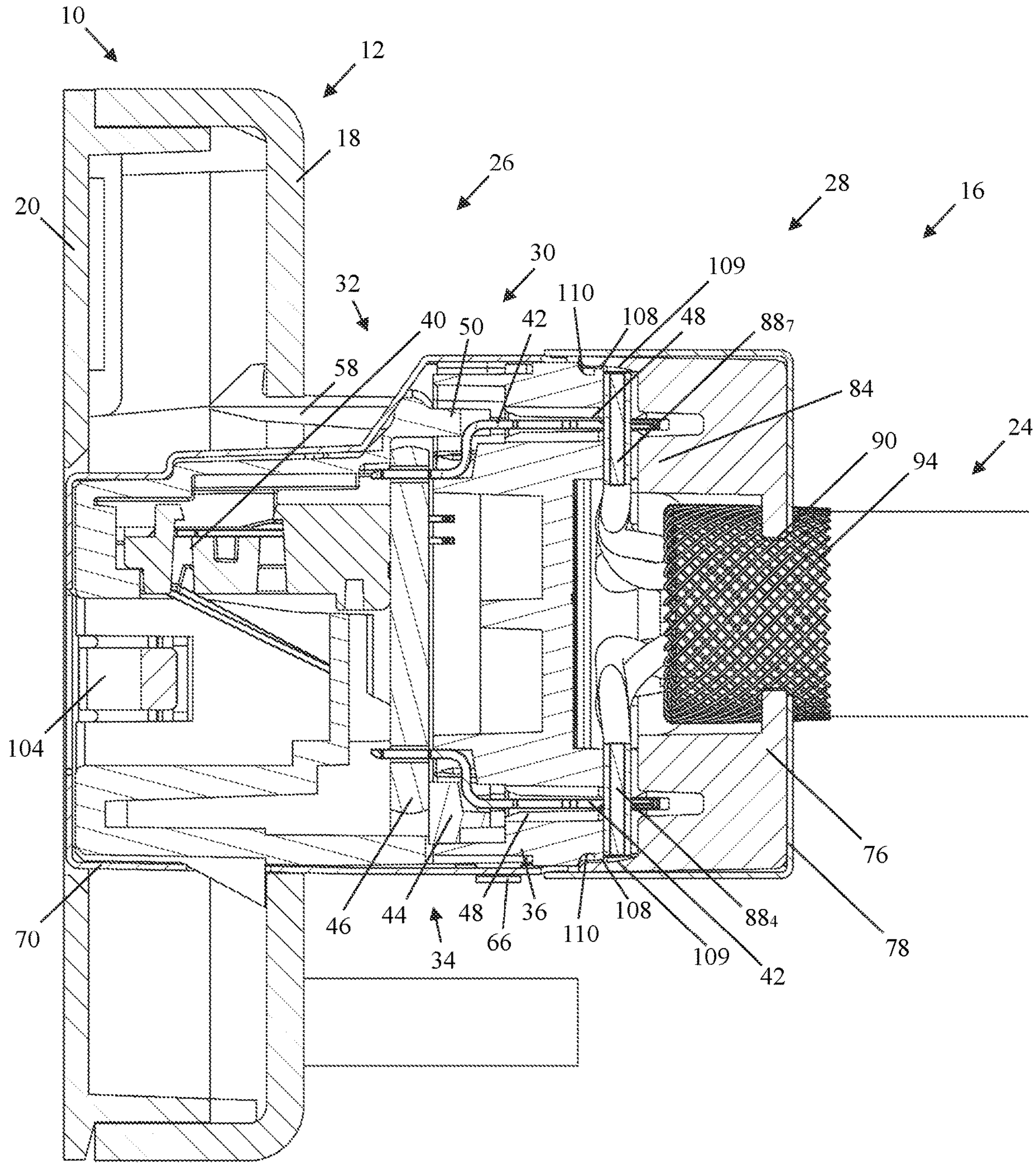
FIG. 18 is a section view of communications system 10 taken about the center line of conductor $\mathbf{88}_4$ and conductor $\mathbf{88}_7$ of an unmated terminated jack assembly 16 secured to shielded patch panel 12.

FIG. 18 is a section view of communications system 10 taken about the center line of conductor $88_4$ and conductor $88_7$ of an unmated terminated jack assembly 16 secured to shielded patch panel 12. Conductors 88 on shielded cable 24 are pressed into slots 86 (FIG. 7-FIG. 14) of rear sled 36 and terminated to long IDCs 42 of jack housing assembly 26. Cut edge 108 on rear sled 36 provides a flat surface for a punch down tool to trim conductors 88 flush. Cable opening 90 on rear wire cover assembly 28 allows for rear wire cover assembly 28 to be placed onto jack housing assembly 26 after shielded cable 24 has been terminated to long IDCs 42 of jack housing assembly 26. Rear wire cover assembly 28 is then placed over the back end of jack housing assembly 26. If the ends of conductors 88 are cut too long or cut without the use of a punch down tool after termination; rounded surfaces 109 on wire cover 76 of rear wire cover assembly 28 help to push excess conductor or dielectric length into overflow channels 110 on rear sled 36 of jack housing assembly 26.

Grounding prongs 92 on wire cover shield wrap 78 of rear wire cover assembly 28 bond to braid 94 of shielded cable 24. Wiping tabs 96 (FIG. 3-FIG. 14) on front shield wrap 30 of jack housing assembly 26 make connection to inside walls 98 (FIG. 15-FIG. 17) on wire cover shield wrap 78 of rear wire cover assembly 28 to create a fully bonded assembly. Capture slots 100 (FIG. 15-FIG. 17) on wire cover 76 of rear wire cover assembly 28 pass over round bosses 102 (FIG. 7-FIG. 14) on rear sled 36 of jack housing assembly 26 and secure rear wire cover assembly 28 to finalize terminated jack assembly 16. Divider walls 84 on wire cover 76 of rear wire cover assembly 28 slide into slots 86 of rear sled 36 of jack housing assembly 26 and help to secure conductors 88 on shielded cable 24.

Figure 19:
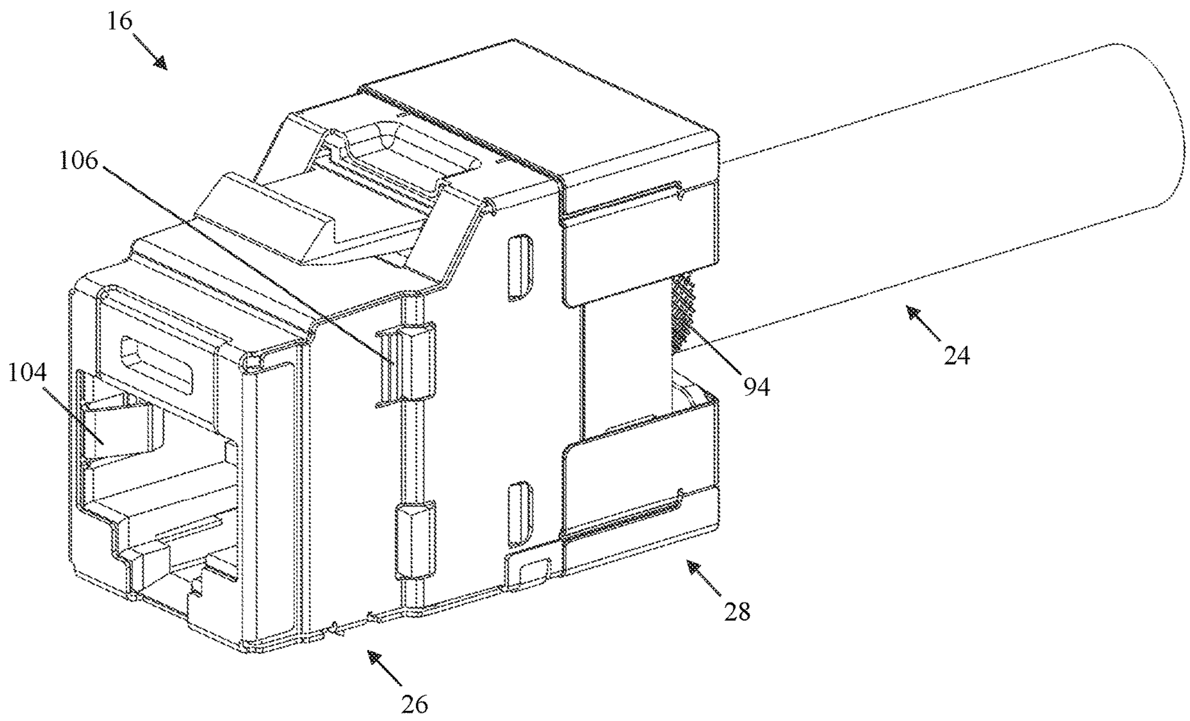
FIG. 19 is a front top view of terminated jack assembly 16.
Figure 20:
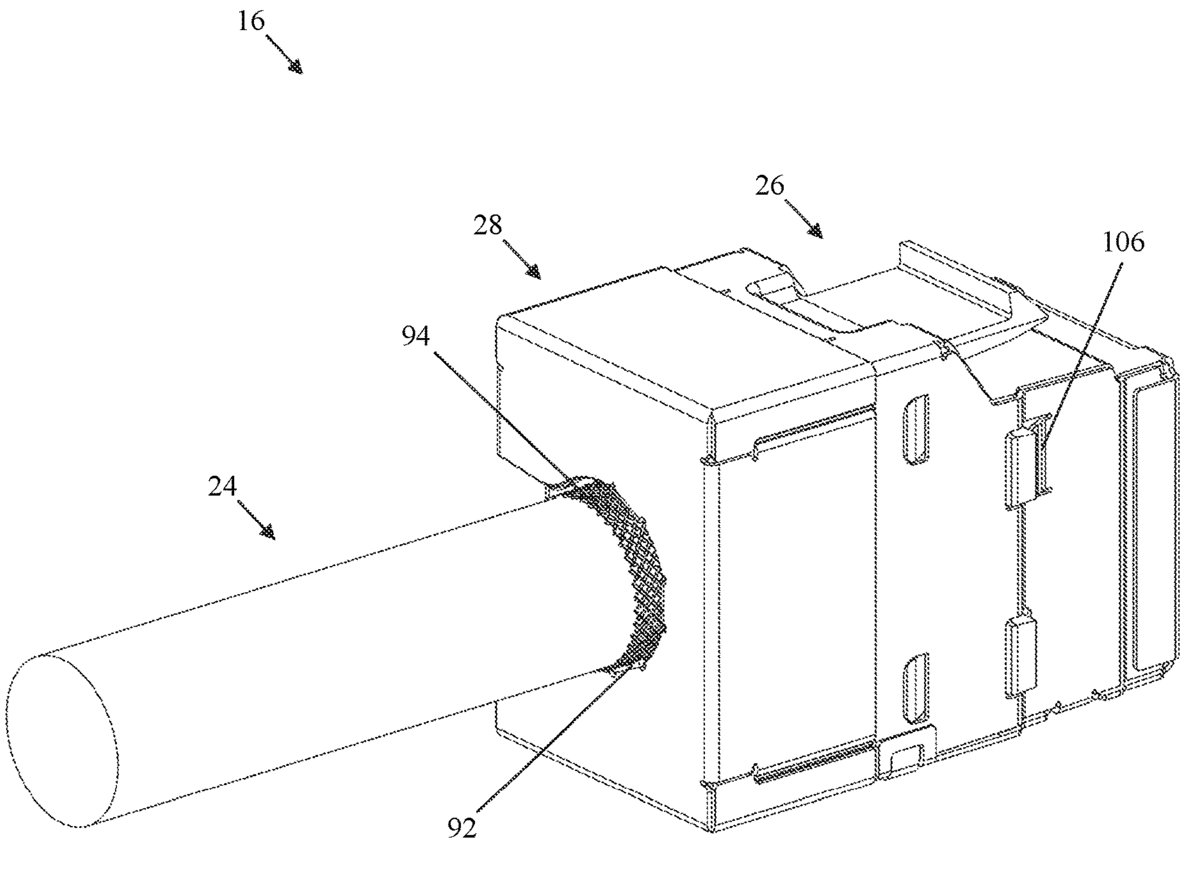
FIG. 20 is a rear top view of terminated jack assembly 16.

FIG. 19 is a front top view of terminated jack assembly 16. FIG. 20 is a rear top view of terminated jack assembly 16. Inner wiping tabs 104 provide a bond between plug shield 23 (FIG. 1) on shielded plug assembly 22 when shielded plug assembly 22 and terminated jack assembly 16 are in a mated state. Grounding tabs 106 are designed to bond terminated jack assembly 16 to shielded patch panel 12 when parts are assembled.

Alternate Embodiment

Figure 21:
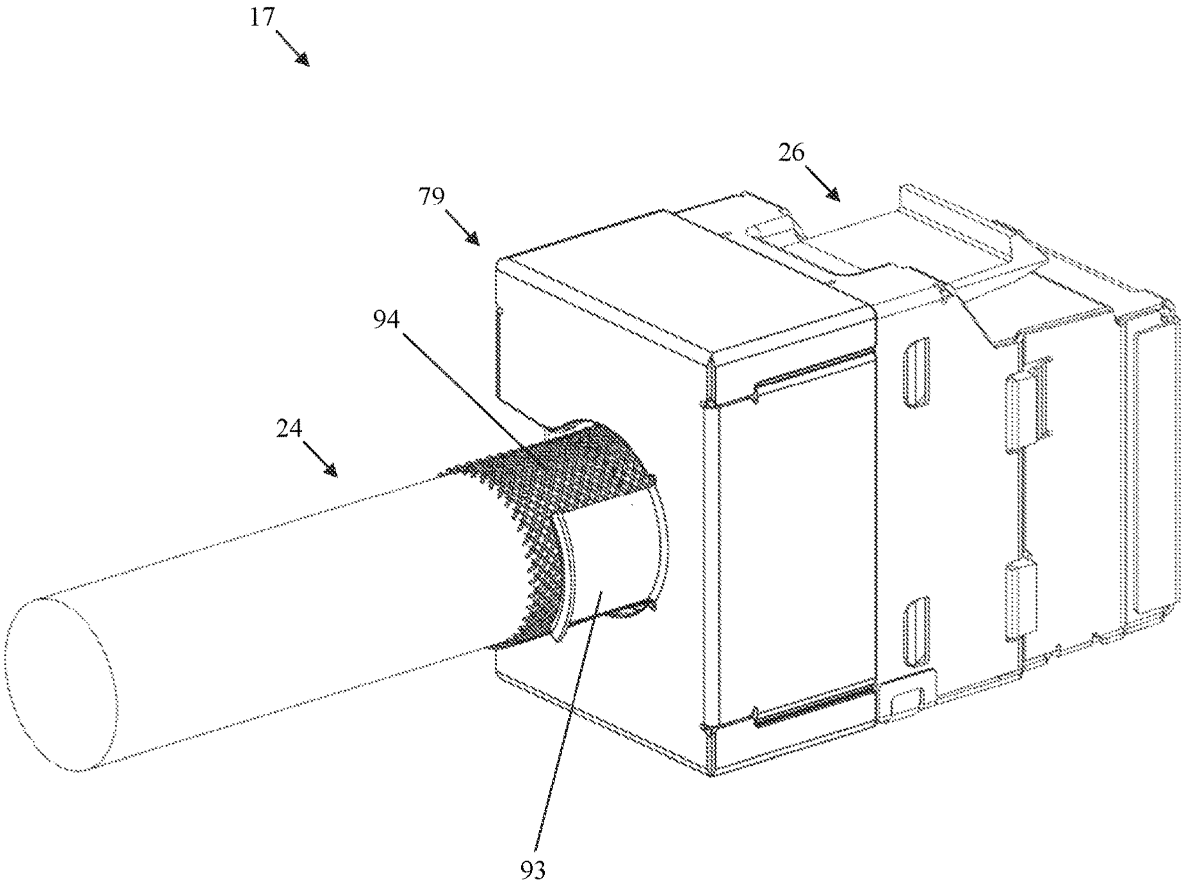
FIG. 21 is a rear top view of alternate terminated jack assembly 17.

FIG. 21 is a rear top view of alternate terminated jack assembly 17. Terminated jack assembly 17 includes all of the same components as terminated jack assembly 16, with the exception of alternate wire cover shield wrap 79. Alternate wire cover shield wrap 79 has identical internal geometry as wire cover shield wrap 78, but instead of inward facing grounding prongs 92, alternate wire cover shield wrap 79 includes grounding flange 93. Grounding flange 93 is an outward facing flange designed to bond around braid 94 of shielded cable 24 with the aid of a cable tie (not pictured).

The invention claimed is:

1. A rear wire cover assembly for a keystone style punchdown jack comprising a rear wire cover having an opening configured to allow the rear wire cover to move in a direction perpendicular to an axis of a cable such from a first position in which the rear wire cover partially encloses the cable to a second position in which the rear wire cover does not partially enclose the cable and also to allow the rear wire cover to move along the axis of the cable to engage a rear of the keystone style punchdown jack and a shield wrap.

2. The rear wire cover assembly of claim 1 wherein the rear wire cover is symmetrical in order to allow it to partially enclose a cable from opposite directions.

3. The rear wire cover assembly of claim 1 wherein the rear wire cover further comprising divider walls configured to slide into slots on the rear of the keystone style puchdown jack such as to secure conductors terminated to the keystone style puchdown jack.

4. The rear wire cover assembly of claim 1 wherein the inside wall of the shield wrap are configured to engage wiping taps on a shield of the keystone style punchdown jack.

5. The rear wire cover assembly of claim 4 wherein the shield wrap further comprises grounding prongs configured to engage a braid of a shielded cable.

6. The rear wire cover assembly of claim 4 wherein the shield wrap further comprises a grounding flange to engage a braid of a shielded cable.

* * * * *